Patented Aug. 6, 1929.

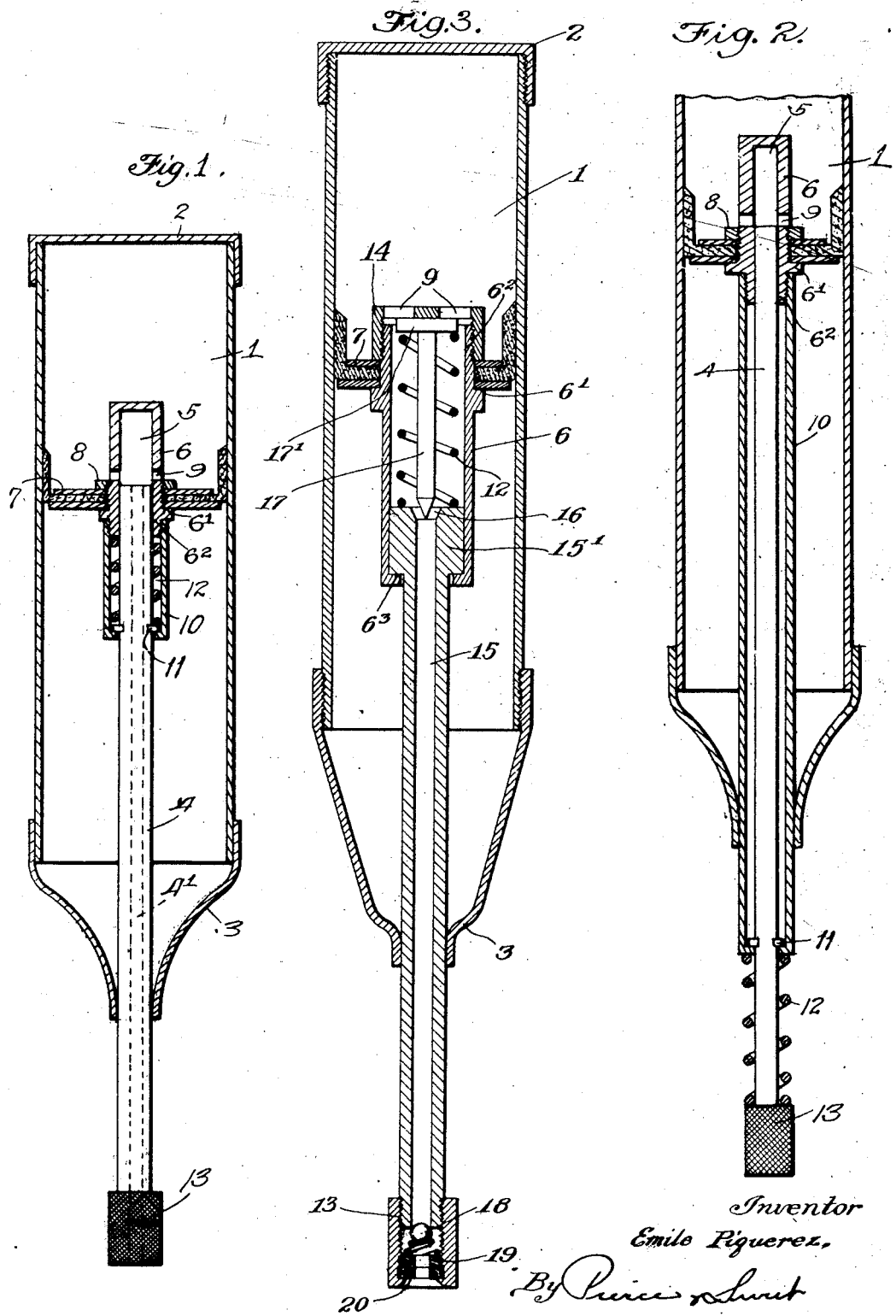

1,723,253

UNITED STATES PATENT OFFICE.

EMILE PIQUEREZ, OF PARIS, FRANCE, ASSIGNOR TO ALEMITE CORPORATION, OF CHICAGO, ILLINOIS, A CORPORATION OF DELAWARE.

DOUBLE-ACTING LUBRICANT COMPRESSOR.

Application filed April 15, 1925, Serial No. 23,353, and in France October 14, 1924.

My invention relates to lubricant compressors, and more specifically to an improved and simplified compressor operable by movement of the lubricant reservoir itself, and especially of the double-acting type.

In the accompanying drawings:

Fig. 1 is a longitudinal section of one embodiment of the invention.

Fig. 2 is a fragmentary longitudinal section of an alternative construction.

Fig. 3 is a longitudinal section of another modification.

In the embodiment of the invention selected for illustration in Fig. 1, the device comprises a lubricant reservoir 1 of cylindrical shape provided with a cover 2, suitably attached thereto, and with a tapered closure 3 guiding the rod of the compressor piston 4. This rod slides in the compression cylinder 5 formed by the central sleeve 6 of the piston 7 of the reservoir, which piston may be built up of a packing placed between two metal plates clamped between a shoulder 6' on the sleeve and a lock nut. Lateral ports 9, in the wall of cylinder 5 just above lock nut 8, admit lubricant.

Sleeve 6 has a threaded extension $6^2$ on which is fixed a cap 10 with its bottom adapted to abut a split washer 11, slipped into a suitable groove in the piston rod 4, so as to determine the end of the intake stroke of the latter, which is held in that position by a coil spring 12 housed in cap 10 between the lower face of extension $6^2$ and washer 11. Piston 4 has a central longitudinal conduit 4' extending to the tube or connection 13 for lubricant delivery, which connects the device with the fitting or other means for receiving the lubricant.

The operation is as follows:

The parts being in the position of Fig. 1, the space between the piston 7 and cover 2 is filled with lubricant, as well as compression cylinder 6. Upon a manual thrust on reservoir 1, the lubricant body bears against piston 7, and cylinder 6 slides down piston 4 to cover the ports 9. During the rest of the stroke, the lubricant caught in the cylinder is pushed through the piston 4 and passes out by conduit 4'. The force necessary for the return stroke is provided by spring 12, which is compressed during the first stroke, and the cylinder slides back on piston 4, developing an increased suction above the same. When ports 9 are uncovered, the lubricant fills the cylinder quickly and the device is ready for another discharge stroke.

In the embodiment of Fig. 2, the general arrangement is the same, but cap 10 extends outside the reservoir, passing through the drawn out end 3, and spring 12 is placed between the head of the cap and the shoulder of the connector 13, still encircling the hollow piston 4. The operation is as before.

In the embodiment of Fig. 3, the piston 7 comprises a suitable packing between two circular metallic clamping plates gripped between a shoulder 6' of the central sleeve 6 and a nut 14 in the form of a cap threaded onto the extension $6^2$ of the sleeve. This sleeve now forms a cylinder with a bottom $6^3$ pierced by the body of the compression cylinder 15, the head 15' of which slides inside sleeve 6.

A conical seat 16 is formed at the top of cylinder 15 to facilitate the entrance of the compression piston 17, in the form of a rod provided with a head 17' held in position in the sleeve 6 by a spring 12 bearing at one end on the head 15' of the compression cylinder and at the other end against the head 17' of the piston which in turn rests on the bottom of nut 14, which bottom contains the ports 9. The body of cylinder 15 passes through the end piece 3 of the lubricant reservoir, and ends in a tubular connector 13 provided with a valve, such as a ball valve 18, controlling the discharge from the cylinder. The valve spring bears on a diaphragm 19 threaded into the tubular body 13, which diaphragm at the same time clamps in place below itself a packing 20, abutting the lower lip of the tubular body 13.

The operation is as follows:

With the parts in the position of Fig. 3, the spaces between piston 7 and cover 2 and the cylinder 15 are full of lubricant. On delivering a thrust on the reservoir body 1, the body of lubricant bearing against piston 7 slides sleeve 6 on the head 15' of the cylinder, the movement being guided by the end piece 3 sliding on the body of cylinder 15. Piston 17 enters cylinder 15 and compresses the lubricant, which escapes through the connector 13 when its pressure is sufficient to open valve 18. The return movement of the piston occurs under the expansive force of spring 12. In rising, piston 17 develops suction below it, which, when it uncovers the counterbore 16, draws in lubricant from sleeve 6, and the apparatus is ready for another discharge stroke.

Without further elaboration, the foregoing will so fully explain the gist of the invention, that others may, by applying current knowledge, readily adapt the same for use under various conditions of service without eliminating certain features which may properly be said to constitute the essential items of novelty involved, which items are intended to be defined and secured by the following claims.

I claim:

1. A lubricant compressor comprising a reservoir, a separate delivery tube supplied therefrom, a confining piston in said reservoir, a resilient lost motion connection between said confining piston and said delivery tube, and a small cylinder carried by said confining piston to co-operate with said tube as a piston upon such relative movement to compress lubricant to a high pressure.

2. In lubricating apparatus of the class described, a compressor comprising a reservoir, a confining piston in said reservoir, high pressure compressing means carried by said piston, said means comprising telescopable tubes, one of said tubes forming a discharge conduit, and resilient means for separating said tubes and actuating said confining piston.

In witness whereof I hereunto subscribe my name, this 23rd day of March, 1925.

EMILE PIQUEREZ.